(12) United States Patent
Kuwabara

(10) Patent No.: US 6,208,410 B1
(45) Date of Patent: Mar. 27, 2001

(54) IMAGE FORMING APPARATUS

(75) Inventor: Takao Kuwabara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/141,517

(22) Filed: Aug. 27, 1998

(30) Foreign Application Priority Data

Aug. 29, 1997 (JP) .................................................. 9-234684

(51) Int. Cl.⁷ ............................ G03B 27/32; G03B 27/00
(52) U.S. Cl. .............................................. 355/405; 355/27
(58) Field of Search .................................. 355/27–29, 40, 355/41, 405; 430/616–620

(56) References Cited

U.S. PATENT DOCUMENTS

| | | | |
|---|---|---|---|
| 5,317,363 | * 5/1994 | Isaka et al. ............................. | 355/27 |
| 5,572,285 | * 11/1996 | Takagi ................................... | 355/27 |
| 5,922,529 | * 7/1999 | Tsuzuki et al. ....................... | 430/619 |
| 5,968,725 | * 10/1999 | Katoh et al. .......................... | 430/619 |

* cited by examiner

*Primary Examiner*—Eddie C. Lee
*Assistant Examiner*—Hung Henry Nguyen
(74) *Attorney, Agent, or Firm*—Sughrue, Mion, Zinn, Macpeak & Seas, PLLC

(57) ABSTRACT

The present invention provides an image forming apparatus for forming an image on a recording material having light interference in which a latent image is formed when irradiated with light and the latent image is rendered visible when heated, which includes a latent image forming light source for irradiating the recording material with incoherent light to form a latent image. The image forming apparatus gives no interference band.

10 Claims, 3 Drawing Sheets

IMAGE FORMING APPARATUS

FIELD OF THE INVENTION

The present invention relates to an image forming apparatus. More particularly, the present invention relates to an image forming apparatus adapted for recording in a dry system such as image recording system using a dry material which requires no wet process.

BACKGROUND OF THE INVENTION

An image forming apparatus for recording medical image such as digital radiography system, CT and MR using a regenerative fluorescent sheet employs a wet process which comprises taking a picture or recording an image on a silver salt system photographic material which is then wet-processed to obtain a reproduced image thereon.

In recent years, on the other hand, a dry system recording apparatus requiring no wet processing has been noted. Such a recording apparatus employs a photosensitive and/or heat-sensitive recording material (light- and heat-sensitive recording material) or a heat-developable photosensitive material film (hereinafter referred to as "recording material"). In this dry system recording apparatus, the recording material is irradiated with laser beam (scanning) at an imagewise exposure zone to form a latent image therein. Thereafter, the recording material is allowed to come in contact with a heating means such as heating drum at a heat development zone to undergo heat development. Thereafter, the recording material on which an image has been formed is discharged from the apparatus.

The foregoing dry system can not only provide image formation in a short period of time as compared with the wet system but also can eliminate the necessity for disposal of waste liquid as in the wet system. It can be well expected that there will be growing demand for this dry system.

In the foregoing dry system, particularly for medical use, a multiple gradation image having a high quality is required. Therefore, even a density variation due to a slight variation of exposure on the recording material can be easily recognized as an uneven image.

On the other hand, the imagewise exposure zone employs laser beam as an exposure light source. The laser beam is a coherent light. Therefore, when the laser beam hits the recording material, it is repeatedly reflected by various layers constituting the recording material to cause the generation of interference band in the image thus formed. As an approach for inhibiting the generation of interference band there has been practiced a method which comprises inhibiting interference by destroying the phase of light reflected in the recording material, e.g., by providing a light-scattering layer under the lowermost image-forming layer of the recording material or roughening the surface of the support supporting the image-forming layer. However, such an approach is disadvantageous in that even the light scattered by the light-scattering layer or roughened surface can form a latent image that causes image quality drop.

SUMMARY OF THE INVENTION

It is therefore an object of the present invention to provide an image forming apparatus for forming an image on a recording material such as light- and heat-sensitive recording material and heat-developable photographic light-sensitive material, which causes no interference band.

The foregoing object of the present invention will become more apparent from the following detailed description and examples.

The foregoing object of the present invention is accomplished by an image forming apparatus for forming an image on a recording material having light interference which forms a latent image therein when irradiated with light, which latent image is rendered visible when heated, characterized in that there is provided a latent image forming means for irradiating the recording material with incoherent light to form a latent image therein.

In accordance with the foregoing constitution, the use of a recording material having light interference and the irradiation of such a recording material with incoherent light that causes no interference even if reflection occurs therein during exposure make it possible to prevent the occurrence of interference band and hence provide a high quality image.

BRIEF DESCRIPTION OF THE DRAWINGS

By way of example and to make the description more clear, reference is made to the accompanying drawings in which.

DETAILED DESCRIPTION OF THE INVENTION

The image forming apparatus of the present invention will be further described in connection with embodiments shown in the accompanying drawings.

Figure 1:
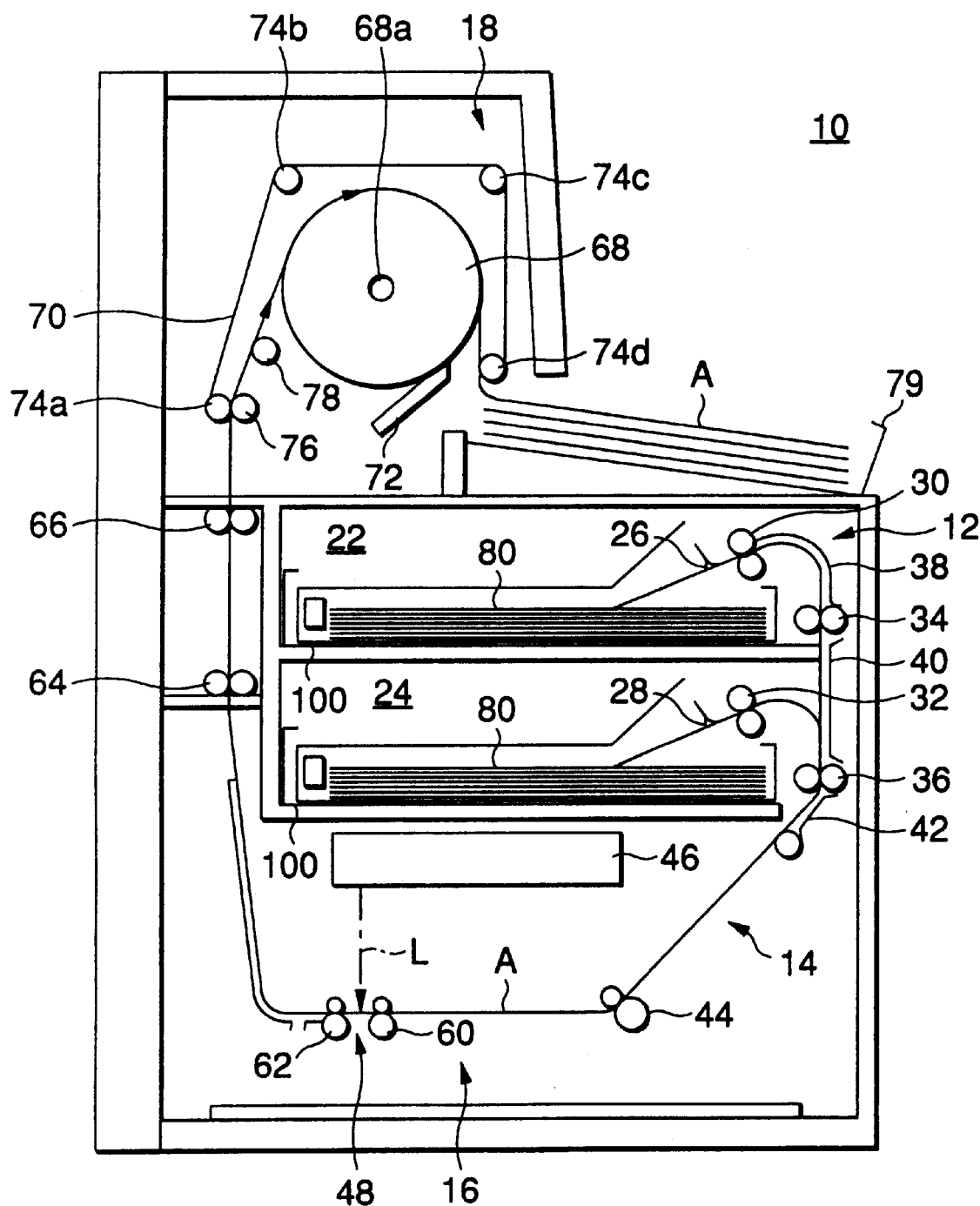
FIG. 1 is a schematic diagram illustrating an image forming apparatus according to the present invention.

FIG. 1 is a schematic diagram illustrating the structure of an image forming apparatus according to the present invention. As shown in FIG. 1, an image forming apparatus 10 comprises as main constituent elements a recording material feed zone 12, a crosswise sliding zone 14, an imagewise exposure zone 16 and a heat development zone 18 arranged in this order along the course of conveyance of a heat-developable photographic light-sensitive material or light- and heat-sensitive recording material (hereinafter referred to as "recording material A").

The recording material feed zone 12 picks up the recording material A one sheet at a time, and then feeds it into the crosswise sliding zone 14, which is disposed downstream on the course of conveyance of the recording material A. The recording material feed zone 12 comprises a recording material feeding means having loading zones 22 and 24 and suckers 26 and 28 arranged in the loading zones 22 and 24, respectively, a pair of feed rollers 30 and 32, a pair of conveyor rollers 34 and 36, and conveyor guides 38, 40 and 42.

The image forming apparatus 10 is loaded with a magazine 100 in which sheets of the recording material A are housed at the loading zones 22 and 24. The embodiment shown in FIG. 1 has two loading zones 22 and 24. The two loading zones are normally loaded with magazines 100 for housing sheets of the recording material A having different sizes (e.g., half size for CT or MRI, B4 size for FCR (Fuji computed radiography)), respectively.

The recording material feeding means provided in the loading zones 22 and 24 uses the suckers 26 and 28 to attract the recording material A which is then carried together with the suckers 26 and 28 which are moved by a known moving means such as link mechanism so that it is passed to the pair of feed rollers 30 and 32.

As the recording material A there may be used a heat-developable recording material or light- and heat-sensitive recording material described further later. In the present invention, such a recording material having light interference is used.

In some detail, a recording material is used which satisfies at least one of the following requirements:

(a) The recording material is a photographic light-sensitive material comprising a photosensitive emulsion layer on at least one side of a support;

(b) The thickness of a support is not less than 50 $\mu$m;

(c) The photosensitive emulsion layer comprises silver halide grains having an average grain size of not more than 0.2 $\mu$m;

(d) The photosensitive emulsion layer exhibits an absorbance of not more than 0.5 with respect to incoherent light described later (within the exposure wavelength range); and (e) The coated amount of the photosensitive emulsion layer is not more than 3 g/m$^2$ as calculated in terms of silver.

A representative example of the support material employable herein is polyethylene terephthalate (PET).

The composition of the silver halide grains to be used herein is not limited but may be any of silver chloride, silver bromochloride, silver bromide, silver bromoiodide, silver bromochloroiodide and silver iodide, preferably silver bromide or silver bromoiodide. The silver halide grains may contain a complex of a metal selected from the group consisting of rhodium, rhenium, ruthenium, osmium, iridium, cobalt, mercury and iron. For the details of such a metal complex, reference can be made to JP-A-7-22549 (The term "JP-A" as used herein means an "unexamined published Japanese patent application"). The phase in the silver halide in which the metal complex is incorporated is not specifically limited. For example, the metal complex may be incorporated uniformly in the silver halide or in the core portion or shell portion in a high concentration. The silver halide grains may be chemically sensitized.

The components other than silver halide grains to be incorporated in the photosensitive emulsion layer is not specifically limited. Examples of these components include known binder, dispersant, sensitizer, fog inhibitor, dye, pigment, toner, and preservative.

The recording material A may further comprise a protective layer for protecting the photosensitive emulsion layer or various interlayers besides the foregoing photosensitive emulsion layer. Furthermore, the recording material A may comprise a back coat layer provided on the side of the support opposite the photographic emulsion layer for the purpose of improving the conveyability thereof. These auxiliary layers, too, may be made of known materials. The recording material A having light interference will be further described hereinafter.

The heat-developable photographic light-sensitive material (hereinafter referred to as "first recording material") comprises a support having on one side thereof an image-forming layer comprising an organic silver salt-reducing agent and a binder comprising a latex in an amount of not less than 50% by weight.

When the first recording material is exposed to light, a photocatalyst such as photosensitive silver halide forms a latent image nucleus. When the first recording material is then heated, silver which has been ionized from the organic silver salt by the action of the reducing agent migrates to thereby combine with the photosensitive silver halide. As a result, crystalline silver is produced to form an image.

The organic silver salt to be incorporated in the image-forming layer of the recording material is relatively fast to light. It is a silver salt which forms a silver image when heated at 80° C. or more in the presence of an exposed photocatalyst (e.g., latent image formed in photosensitive silver halide) and a reducing agent. It may be desalted as necessary.

As such an organic silver salt there may be used a silver salt of an organic acid, preferably a silver salt of a long-chain aliphatic carboxylic acid having from 10 to 30 carbon atoms, or a complex of organic or inorganic silver salt containing ligands having a complex stability constant of from 4.0 to 10.0. Specific examples of these organic silver salts include silver behenate, silver arachidate, silver stearate, silver oleate, silver laurate, silver caproate, silver myristate, silver palmitate, silver maleate, silver fumarate, silver tartrate, silver linoleate, silver butyrate, and silver camphorate.

As the organic silver salt there may be preferably used a silver salt of a compound containing mercapto group or thione group or derivative thereof as well. Specific examples of these organic silver salts include silver salts of thioglycolic acid such as silver salt of 3-mercapto-4-phenyl-1,2,4-triazole, silver salt of 2-mercaptobenzimidazole, silver salt of 2-mercapto-5-aminothiadiazole and silver salt of s-alkylthioglycol, silver salts of dithiocarboxylic acid such as silver salt of dithioacetic acid, silver salt of thioamide, silver salt of 5-carboxyl-1-methyl-2-phenyl-4-thiopyridine, silver salt of mercaptotriazine, and silver salt of 2-mercaptobenzoxazole.

The organic silver salt is preferably in the form of acicular crystal having a minor axis and a major axis. More preferably, the minor axis and the major axis have a length of from 0.01 $\mu$m to 0.20 $\mu$m and from 0.10 $\mu$m to 5.0 $\mu$m, respectively.

The organic silver salt is preferably monodisperse. In some detail, the percentages obtained by dividing the standard deviation of the length of minor axis and major axis by the minor axis and major axis, respectively, each is preferably not more than 100%.

The organic silver salt is preferably in the form of a dispersion of finely divided solid particles which undergo no agglomeration. Such a dispersion can be prepared by the use of a known dispersant such as polyacrylic acid, polyvinyl alcohol and polyvinyl pyrrolidone.

The dispersion of the fine solid particles of the organic silver salt can be prepared by known mechanical pulverization and dispersion methods, for example, using a ball mill, oscillating mill or the like in the presence of a dispersant.

Besides the foregoing mechanical dispersion method, a method which comprises controlling the pH to effect coarse dispersion in a solvent, and then changing the pH in the presence of a dispersing agent to obtain finely divided particles may be used.

The amount of the organic silver salt to be used is preferably from 0.1 to 5 g/l, more preferably from 1 to 3 g/l as calculated in terms of silver.

As the reducing agent for reducing such an organic silver salt there may be used any material which reduces silver ion to metallic silver. Such a material is preferably an organic material. Examples of such a reducing agent include various known reducing agents to be incorporated in recording materials comprising an organic silver salt as disclosed in JP-A-57-82829, JP-A-6-3793, and U.S. Pat. No. 5,464,738.

Specific examples of these reducing agents include amidoxime such as phenylamidoxime, azine such as 4-hydroxy-3,5-dimethoxybenzaldehyde azine, hydroxamic acid such as phenylhydroxamic acid, α-cyanophenylacetic acid derivative such as ethyl-α-cyano-2-methylphenyl acetate, bis-β-naphthol such as 2,2'-dihydroxy-1,1'-binaphtyl, 5-pyrazolone such as 3-methyl-1-phenyl-5-pyrazolone, reductone such as dimethylaminohexose reductone, sulfonamidephenol reducing agent such as 2,6-dichloro-4-benzenesulfonamidephenol, chroman such as 2,2-dimethyl-7-t-butyl-6-hydroxychroman, 1,4-dihydropyridine such as 2,6-dimethoxy-3,5-dicarboethoxy-1,4-dihydropyridine, bisphenol such as bis (2-hydroxy-3-t-butyl-methylphenyl) methane, 2,2-bis(4-hydroxy-3-methylphenyl)propane, 4,4-ethylidene-bis(2-t-butyl-6-methylphenol), 1,1-bis(2-hydroxy-3,5-dimethylphenyl)-3,5,5-trimethylhexane and 2,2-bis(3,5-dimethyl-4-hydroxyphenyl) propane, ascorbic acid derivative such as 1-ascorbyl palmitate, and chromanol such as tocophenol. Particularly preferred among these reducing agents are bisphenol and chromanol.

Besides these reducing agents, known photographic developers such as phenidone, hydroquinone and catechol may be preferably used. In particular, hindered phenol reducing agents are desirable.

The reducing agent can be incorporated in the image-forming layer in the form of solution, powder, solid particulate dispersion, etc. The solid fine pulverization and dispersion of the reducing agent is accomplished by the use of a known pulverization means (e.g., ball mill, oscillating ball mill). The solid atomization and dispersion may be facilitated by the use of a dispersing aid.

The amount of the reducing agent to be used is preferably from about 5 to 50 mol % per mol of silver on the image-forming layer side. The reducing agent is basically incorporated in the image-forming layer. However, the reducing agent may be incorporated in other layers on the image-forming layer side. In this case, the amount of the reducing agent to be used is preferably as greater than above as from 10 to 50 mol % per mol of silver. Further, the reducing agent may be in the form of a so-called precursor, i.e., form which has been derived so as to exert its effect only during development.

The image-forming layer of the recording material comprises a substance which becomes a photocatalyst when exposed to light, e.g., photosensitive silver halide (hereinafter referred to as "silver halide").

The halogen composition of the silver halide is not specifically limited but may be any of silver chloride, silver bromochloride, silver bromide, silver bromoiodide, silver bromochloroiodide and silver iodide, preferably silver bromide or silver bromoiodide.

The grain size of the silver halide is preferably not more than 0.20 μm to inhibit the clouding after image formation. The silver halide grains are preferably in the form of cube or tablet.

The silver halide grains preferably comprise at least one complex of a metal selected from the group consisting of rhodium, rhenium, ruthenium, osmium, iridium, cobalt, mercury and iron in an amount of from about 1 nmol to 10 mmol per mol of silver. For the details of such a metal complex, reference can be made to JP-A-7-22549.

The phase in the silver halide in which the metal complex is incorporated is not specifically limited. For example, the metal complex may be incorporated uniformly in the silver halide or in the core portion or shell portion in a high concentration.

The silver halide grains may be chemically sensitized.

The chemical sensitization method is not specifically limited. Examples of the chemical sensitization method employable herein include sulfur sensitization method, selenium sensitization method, tellurium sensitization method using diacyl telluride, bis(oxycarbonyl) telluride or the like, noble metal sensitization method using chloroauric acid, potassium chloroaurate or the like, and reduction sensitization method using ascorbic acid, thiourea dioxide or the like.

Alternatively, reduction sensitization method which comprises keeping the pH or pAg value of the emulsion at not less than 7 or not more than 8.3, respectively to effect ripening or which comprises introducing single addition portions of silver ion during the formation of grains may be used.

The amount of the silver halide to be used is preferably from 0.01 mols to 0.5 mols per mol of organic silver salt.

Referring to the method and conditions of mixing silver halide grains and an organic silver salt which have been separately prepared, the silver halide grains and the organic silver salt which have been prepared may be immediately mixed by means of a high speed agitator, ball mill, sand mill, colloid mill, oscillating mill, homogenizer or the like. Alternatively, the silver halide grains which have been prepared may be added at any step during the preparation of the organic silver salt.

Referring to the method for preparing the silver halide grains and mixing it with the organic silver salt, a so-called halidation method may be preferably used which comprises the halogenation of some silver in the organic silver salt with an organic or inorganic halide. Examples of the organic halide employable herein include N-halogenoimide such as N-bromosuccinimide, and halogenated quaternary nitrogen compound such as brominated tetrabutylammonium. Examples of the inorganic halide employable herein include halogenated alkaline metal such as lithium bromide and potassium iodide, halogenated ammonium such as ammonium bromide and halogenated alkaline earth metal such as calcium bromide, and halogen such as bromine and iodine. The amount of the halide to be added during halidation is preferably from 1 mmol to 500 mmol per mol of organic silver salt as calculated in terms of halogen.

In the recording material of the present invention, the image-forming layer having the foregoing composition comprises a latex, in which a water-insoluble hydrophobic polymer is finely dispersed in a water-soluble dispersant, in a proportion of not less than 50% by weight based on the total weight of the binder. Further, the other layers may have similar structure as necessary.

Referring to the dispersion of the latex, the polymer may be emulsified in the dispersant. Alternatively, the latex may be a product of emulsion polymerization. Alternatively, the latex may be a micellar dispersion. Alternatively, the latex may be a polymer the molecule of which is partially hydrophilic enough to allow the molecular dispersion of molecular chains. Further, the latex may be of a so-called core/shell type instead of having ordinary uniform structure.

For the details of such a latex, reference can be made to Taira Okuda and Hiroshi Inagaki, "Gosei Jushi Emulsion (Synthetic resin emulsion)", Kobunshi Kankokai, 1978, Takaaki Sugimura, Haruo Kataoka, Souichi Suzuki and Keiji Kasahara, "Gosei Ratekkusu no ouyou (Application of synthetic latex)", Kobunshi Kankokai, 1993, Souichi Muroi, "Gosei Ratekkusu no kagaku (Chemistry of synthetic latex)", Kobunshi kankokai, 1970, etc.

Examples of the latex polymer include acrylic resin, vinyl acetate, polyester resin, polyurethane resin, rubber resin, vinyl chloride resin, vinylidene chloride resin, and polyolefin resin.

The polymer may be a straight-chain or branched polymer or may be branched. The polymer may be a so-called homopolymer obtained by the polymerization of monomers of the same kind or a copolymer obtained by the polymerization of two kinds of monomers. The copolymer, if used, may be a random copolymer or block copolymer.

The polymer has a number-average molecular weight of from 5,000 to 1,000,000, preferably from 10,000 to 100,000. If the molecular weight of the polymer falls below the above defined range, the resulting photosensitive layer exhibits an insufficient dynamic strength. If the molecular weight of the polymer exceeds the above defined range, the polymer exhibits deteriorated film-forming properties.

Specific examples of such a polymer include methyl methacrylate/ethyl acrylate/methacrylic acid copolymer, methyl methacrylate/2-ethylhexyl acrylate/styrene/acrylic acid copolymer, styrene/butadiene/acrylic acid copolymer, styrene/butadiene/divinyl benzene/methacrylic acid copolymer, methyl methacrylate/vinyl chloride/acrylic acid copolymer, and vinylidene chloride/ethyl acrylate/acrylonitrile/ methacrylic acid copolymer.

As the polymer employable herein there may be used any commercially available product. For example, Cevian A-4635 (produced by DAICEL CHEMICAL INDUSTRIES, LTD.) may be used as an acrylic resin. FINETEX ES650 (produced by DAINIPPON INK & CHEMICALS, INC.) may be used as a polyester resin. HYDRAN AP10 (produced by DAINIPPON INK & CHEMICALS, INC.) may be used as a polyurethane resin. LACSTAR 7310 (produced by DAINIPPON INK & CHEMICALS, INC.) may be used as a rubber resin. G351 (produced by Nippon Zeon Co., Ltd.) may be used as a vinyl chloride resin. L502 (produced by ASAHI CHEMICAL INDUSTRY CO., LTD.) may be used as a vinylidene chloride resin. Chemipearl S120 (produced by Mitsui Petrochemical Industries, Ltd.) may be used as a polyolefin resin.

These polymers may be used singly. Alternatively, two or more of these polymers may be blended.

The disperse grains in the latex preferably has an average grain size of from 1 to 50,000 nm, more preferably from 5 to 1,000 nm. The distribution of grain size of disperse grains is not specifically limited. The latex may have a wide grain size distribution or may be monodisperse.

The lowest film-forming temperature (MFT) of the latex is preferably from −30° C. to 90° C., more preferably from 0° C. to 70° C.

As previously mentioned, the image-forming layer of the recording material preferably comprises a latex in an amount of not less than 50% by weight, more preferably not less than 70% by weight based on the total weight of the binder.

The image-forming layer may further comprise a hydrophilic polymer such as gelatin, polyvinyl alcohol, methyl cellulose, hydroxypropyl cellulose, carboxymethyl cellulose and hydroxypropylmethyl cellulose incorporated therein in an amount of not more than 50% by weight based on the total weight of the binder as necessary. The amount of the hydrophilic polymer to be incorporated is preferably not more than 30% by weight based on the total weight of the binder in the photosensitive layer.

The disperse grains (polymer) in the latex preferably have an equilibrium moisture content of not more than 2 wt %, more preferably not more than 1 wt %, at 25° C. and 60% RH.

The image-forming layer of the recording material or other layers on the same side as the image-forming layer may comprise an additive known as toner incorporated therein preferably in an amount of approximately from 0.1 mol % to 50 mol % per mol of silver for the purpose of improving the optical density of the image thus formed. The toner may be in the form of a precursor which has been derived so as to exert its effect only during development.

As the toner there may be used any known toner for use in recording materials. Specific examples of the toner employable herein include phthalimide compounds such as phthalimide and N-hydroxyphthalimide, cyclic imides such as succinimide and pyrazoline-5-one, naphthalimides such as N-hydroxy-1,8-naphthalimide, cobalt complexes such as cobalt hexamine trifluoroacetate, mercaptans such as 3-mercapto-1,2,4-triazole and 2,4-dimercaptopyrimidine, phthaladione derivatives such as 4-(1-naphthyl) phthaladinone, and metal salts thereof. The toner may be incorporated in the coating solution in the form of solution, powder or solid particulate dispersion.

The recording material having the foregoing image-forming layer may optionally comprise a sensitizing dye incorporated in the image-forming layer and/or other layers preferably in an amount of from $10^{-6}$ to 1 mol per mol of silver halide in the image-forming layer.

As the sensitizing dye there may be used any sensitizing dye which can spectrally sensitize silver halide grains within a desired wavelength range when adsorbed by the silver halide grains. Examples of such a sensitizing dye include cyanine dye, melocyanine dye, complex cyanine dye, complex melocyanine dye, holopolar cyanine dye, styryl dye, hemicyanine dye, oxonol dye, and hemioxonol dye. A sensitizing dye having a spectral sensitivity suitable for the spectral properties of recording light L may be selected.

In order to incorporate the sensitizing dye in the silver halide emulsion, the sensitizing dye may be directly dispersed in the emulsion or may be added to the emulsion in the form of solution in water, methanol, ethanol, N, N-dimethylformamide, etc., singly or in admixture.

The image-forming layer and/or other layers of the recording material may further comprise a fog inhibitor, stabilizer, stabilizer precursor or the like incorporated therein for the purpose of inhibiting additional fogging or sensitivity drop during storage.

Examples of the fog inhibitor, stabilizer and stabilizer precursor include thiazonium salts described in U.S. Pat. No. 2,131,038, azaindene described in U.S. Pat. No. 2,886,437, mercury salts described in U.S. Pat. No. 2,728,663, and urazol described in U.S. Pat. No. 3,287,135. As the fog inhibitor there may be used an organic halide described in JP-A-50-119624 and JP-A-8-15809 as well.

The fog inhibitor or other additives may be added to the coating solution in the form of solution, powder, solid particulate dispersion or the like.

The image-forming layer and/or other layers of the recording material may comprise benzoic acids for the purpose of sensitization or fog inhibition.

As the benzoates there may be used various benzoic acid derivatives. Preferred examples of these benzoic acid derivatives include compounds disclosed in U.S. Pat. No. 4,787,939 and JP-A-9-329865. These compounds may be added to the coating solution in the form of powder, solution or particulate dispersion.

The amount of the benzoic acids to be incorporated may be arbitrary but is preferably from 1 μmol to 2 mol per mol of silver.

The image-forming layer and/or other layers of the recording material may comprise a mercapto compound, disulfide compound or thione compound incorporated therein for the purpose of inhibiting or accelerating development, enhancing spectral sensitization efficiency and improving preservability before and after development.

The mercapto compound, if used, may have any structure but is represented by Ar—SM or Ar—S—S—Ar (in which M represents a hydrogen atom or alkaline metal atom, and Ar represents an aromatic ring or condensed aromatic ring having one or more of nitrogen, sulfur, oxygen, selenium and tellurium). Specific examples of the mercapto compound include 2-mercaptobenzimidazole, 2-mercaptobenzoxazole, 2-mercaptobenzothiazole, 2-mercapto-5-methylbenzimidazole, 6-ethoxy-2-mercaptobenzothiazole, 4,5-diphenyl-2-imidazolethiol, and 2-mercaptoimidazole.

The amount of the mercapto compound to be incorporated is preferably from 0.001 mol to 1.0 mol per mol of silver.

The image-forming layer and/or other layers of the recording material may further comprise various dyes or pigments incorporated therein for the purpose of improving tone, inhibiting irradiation, etc.

As such a dye or pigment there may be used any dye or pigment as described in color index. Specific examples of these dyes or pigments include organic pigments such as pyrazoloazole dye, anthraquinone dye, azo dye, azomethine dye, oxonol dye, carbocyanine dye, styryl dye, triphenylmethane dye, indoaniline dye, indophenol dye and phthalocyanine dye, and inorganic pigments. These dyes or pigments may be added to the coating solution in the form of solution, emulsion or solid particulate dispersion or after mordanted by a high molecular mordant.

The amount of the foregoing compound to be used herein depends on the desired absorption but normally is from about 1 μg to 1 g per liter.

The image-forming layer and/or other layers of the recording material may further comprise a plasticizer and a lubricant (glycerin and diol of the kind described in U.S. Pat. No. 2,960,404), an ultrahigh contrast developer (hydrazine derivative described in JP-A-9-304872), a high contrast development accelerator (onium salts described in JP-A-9-297368), a hardener (polyisocyanates described in JP-A-6-208193) or the like incorporated therein besides the foregoing components.

The recording material of the present invention may comprise various layers besides the image-forming layer.

In some detail, the recording material may comprise a surface protective layer provided thereon for the purpose of protecting the image-forming layer or inhibiting the adhesion of foreign matters. The surface protective layer is made of an anti-adhesion material such as wax, particulate silica, styrene-containing elastomer-based block copolymer (e.g., styrene-butadiene-styrene), cellulose acetate, cellulose acetate butyrate and cellulose propionate.

The recording material of the present invention may comprise an antihalation layer provided therein.

The antihalation layer preferably exhibits a maximum absorption of from 0.3 to 2 within a desired wavelength range and an absorption of from 0.001 to 0.5 within the visible range after processed.

As an antihalation dye to be incorporated in the antihalation layer there may be used any compound which exhibits a desired absorption within the desired wavelength range, a satisfactorily reduced absorption within the visible range after processed and provides the resulting antihalation layer with a desired absorbance spectrum configuration. Examples of such a compound include those described below, but are not limited to these compounds. Examples of the dye to be used singly include compounds disclosed in JP-A-7-11432 and JP-A-7-13295, and examples of the dye which discolors when processed include compounds disclosed in JP-A-52-139136 and JP-A-7-199409.

The recording material of the present invention preferably comprises an image-forming layer provided on one side of a support and a back coat layer provided on the other side of the support.

The back coat layer may comprise a matting agent incorporated therein to improve the conveyability of the recording material. As the matting agent there may be normally used a water-insoluble organic or inorganic particulate compound. Preferred examples of the organic compound include water-dispersible vinyl polymers such as polymethyl acrylate, methyl cellulose, carboxy starch and carboxynitrophenyl starch. Preferred examples of the inorganic compound include silicon dioxide, titanium dioxide, magnesium dioxide, aluminum oxide, and barium sulfate.

The size and shape of the matting agent are not specifically limited. In practice, however, a matting agent having a grain size of from 0.1 to 30 μm is desirable. Referring to the degree of matte finish of the back coat layer, the back coat layer preferably exhibits a Bekk smoothness of from 10 to 250 seconds.

As the binder constituting the back coat layer there may be preferably used any colorless and transparent or semi-transparent resin. Examples of such a resin include gelatin, gum arabic, polyvinyl alcohol, hydroxyethyl cellulose, cellulose acetate, cellulose acetate butyrate, casein, starch, poly(meth)acrylic acid, polymethylmethacrylic acid, and polyvinyl chloride.

The back coat layer preferably exhibits a maximum absorption of from 0.3 to 2 within a desired wavelength range. The back coat layer may contain an antihalation dye to be incorporated in the foregoing antihalation layer as necessary.

The recording material of the present invention may further comprise a backside resistive heating layer disclosed in U.S. Pat. Nos. 4,460,681 and 4,374,921 provided on the back coat layer side of the support.

The recording material of the present invention may further comprise an antistatic or electrically-conductive layer comprising a soluble salt (e.g., chloride, nitrate) or deposited metal layer, a layer containing an ionic polymer disclosed in U.S. Pat. No. 2,861,056, a layer containing an insoluble inorganic salt disclosed in U.S. Pat. No. 3,428,451 or the like provided therein.

Another example of the recording material which can be applied to the image forming apparatus of the present invention is a light- and heat-sensitive recording material described below. The light- and heat-sensitive recording material (hereinafter referred to as "second recording material") is a recording material comprising a light- and heat-sensitive recording layer provided on a support, the light- and heat-sensitive recording layer comprising an electron donative colorless dye incorporated in a heat-sensitive microcapsule, and a compound having an electron attractive moiety and a polymerizable vinyl monomer moiety in the same molecule, and a photopolymerization initiator contained outside the heat-sensitive microcapsule.

A further example of the light- and heat-sensitive recording material (hereinafter referred to as "third recording material") is a recording material comprising a light- and heat-sensitive recording layer provided on a support, the light- and heat-sensitive recording layer comprising an electron donative colorless dye incorporated in a heat-sensitive microcapsule, and an electron attractive compound, a polymerizable vinylmonomer, and a photopolymerization initiator contained outside the heat-sensitive microcapsule.

When the recording material of the present invention is exposed to light, the composition present outside the heat-sensitive microcapsule (hereinafter referred to as "photo-setting composition") undergoes hardening and fixation. When the recording material is then heated, the compound having an electron attracting moiety and a polymerizable vinyl monomer moiety or electron attractive compound, which is mobile (unfixed), migrates in the light- and heat-sensitive recording layer to allow the electron donative colorless dye in the microcapsule to develop color and hence form an image.

The compound having an electron attractive moiety and a polymerizable vinyl monomer moiety in the same molecule to be incorporated in the photo-setting composition of the second recording material is a compound having an electron attractive group and a vinyl group in the same molecule.

Specific examples of such a compound include styrenesulfonylaminosalicylic acid, vinylbenzyloxyphthalic acid, zinc β-(meth)acryloxyethoxysalicylate, vinyloxyethyloxy benzoic acid, β-(meth)acryloxyethyl orselinate, β-(meth)acryloxyethoxyphenol, β-(meth)acryloxy ethyl-β-resorcinate, N-ethylamide hydroxystyrenesulfonate, β-(meth)acryloxypropyl-p-hydroxybenzoate, (meth)acryloxy methylphenol, (meth)acrylamidepropanesulfonic acid, β-(meth)acryloxyethoxy-dihydroxybenzene,γ-styrenesulfonyloxy-β-(meth)acryloxypropanecarboxylic acid, γ-(meth)acryloxypropyl-α-hydroxyethyloxysalicylic acid, β-hydroxyethoxycarbonyl phenol, amidephenol 3,5-distyrenesulfonate, (meth)acryloxy ethoxyphthalic acid, (meth)acrylic acid, (meth)acryloxyethoxy hydroxynaphthoic acid, β-(meth)acryloxyethyl-p-hydroxy benzoate, β'-(meth)acryloxyethyl-β-resorcinate, β-(meth)acryloxyethyloxycarbonylhydroxybenzoic acid, and salt thereof with metal such as zinc.

These compounds may be preferably used as polymerizable vinyl monomers of the photo-setting composition of the third recording material as well.

As the polymerizable vinyl monomer to be used in the third recording material there may be used any monomer having at least one vinyl group per molecule. Examples of the monomer employable herein include (meth)acrylic acid, salt thereof, (meth)acrylic acid esters, (meth)acrylamide, maleic anhydride, maleic acid esters, itaconic acid, itaconic acid esters, styrene, vinyl ethers, vinyl esters, N-vinyl heterocycles, allyl ethers, and allyl esters. In particular, a monomer having a plurality of vinyl groups per molecule is desirable. Examples of such a monomer include (meth)acrylic acid esters of polyvalent alcohols, polyvalent phenols, bisphenols such as (meth)acrylic acid ester, (meth)acrylate-terminated epoxy resins, and (meth)acrylate-terminated polyesters. Specific examples of these compounds include ethylene glycol diacrylate, ethylene glycol dimethacrylate, trimethylolpropane triacrylate, pentaerythritol tetracrylate, dipentaerythritol hydroxypentacrylate, hexanediol-1,5-dimethacrylate, and diethylene glycol dimethacrylate.

Such a monomer preferably has a molecular weight of from about 100 to about 5,000.

The photopolymerization initiator to be incorporated in the second and third recording materials (hereinafter altogether referred to as "recording material") is a compound capable of initiating the photopolymerization of the foregoing vinyl monomer, preferably an organic borate compound (as disclosed in JP-A-62-143044), more preferably an organic borate of cationic dye, which, when used in combination with a green-absorbing dye or a dye which absorbs light in the wavelength ranging from red to infrared, exhibits photosensitivity to light in the foregoing wavelength range and produces a radical when irradiated with light.

An organic borate produces a radical in response to laser beam with which it has been irradiated. The radical thus produced initiates the polymerization of the foregoing vinyl monomer moiety.

As such an organic borate there may be used a compound represented by the following general formula (1):

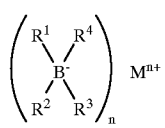

(1)

wherein M represents a cation selected from the group consisting of alkaline metal atom, quaternary ammonium, pyridinium, quinolinium, diazonium, morpholinium, tetrazolium, acrydinium, phosphonium, sulfonium, oxosulfonium, sulfur, oxygen, carbon, halogenium, Cu, Ag, Hg, Pd, Fe, Co, Sn, Mo, Cr, Ni, As and Se; n represents an integer of from 1 to 6; and $R^1$, $R^2$, $R^3$ and $R^4$ may be the same or different and each represent a halogen atom, substituted or unsubstituted alkyl group, substituted or unsubstituted alkenyl group, substituted or unsubstituted alkinyl group, substituted or unsubstituted aryl group, substituted or unsubstituted alkylaryl group, substituted or unsubstituted aryloxy group, substituted or unsubstituted aralkyl group, substituted or unsubstituted heterocyclic group or substituted or unsubstituted silyl group, with the proviso that two or more of $R^1$, $R^2$, $R^3$ and $R^4$ may be bonded to each other to form a cyclic structure.

Examples of the borate anion structure contained in the foregoing general formula (1) include tetraethyl borate, triisobutylmethyl borate, di-n-butyl-di-t-butyl borate, tetraphenyl borate, tetra-p-chlorophenyl borate, tri-m-chlorophenyl-n-hexyl borate, triphenylethyl borate, trimethylbutyl borate, tritolylisopropyl borate, triphenylbenzyl borate, tetraphenyl borate, tetrabenzyl borate, triphenylphenethyl borate, triphenyl-p-chlorobenzyl borate, di(α-nephthyl)-dipropyl borate, triphenylsilyl triphenyl borate, tritoluylsilylphenyl borate, and tri-n-butyl (dimethylphenylsilyl)borate.

Examples of the organic borate represented by the general formula (1) will be given below.

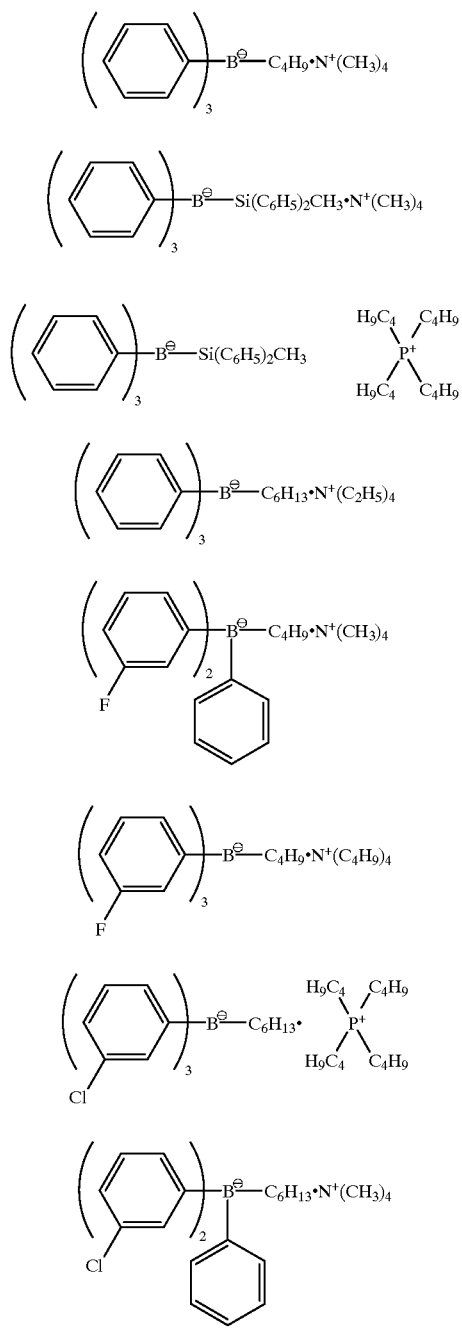

In order to enhance the efficiency of absorption of light such as recording light L, the organic borate represented by the foregoing general formula (1) is preferably used in combination with a dye which absorbs light in the wavelength ranging from green to red and infrared light as a spectral sensitizing dye.

In particular, an organic cationic dye having a maximum absorption in the wavelength range of from 500 to 1,100 nm is preferably used. Examples of such an organic cationic dye include cationic methine dye, cationic carbonium dye, cationic quinonimine dye, cationic indoline dye, and cationic styryl dye. Specific examples of the cationic methine dye include polymethine dye, cyanine dye, and azomethine dye. Preferred examples of the cationic methine dye include cyanine, carbocyanine, dicarbocyanine, tricarbocyanine, and hemicyanine. Specific examples of the cationic carbonium dye include triarylmethane dye, xanthene dye, and acridine dye. Preferred examples of the cationic carbonium dye include rhodamine. As the cationic quinonimine dye there may be preferably used a dye selected from the group consisting of azine dye, oxazine dye, thiazine dye, quinoline dye and thiazole dye. These dyes may be used singly. Alternatively, two or more of these dyes may be used in combination.

As the photopolymerization initiator there can be more preferably used an organic borate of cationic dye represented by the following general formula (2):

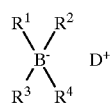

(2)

wherein $D^+$ represents a cationic dye; and $R^1$, $R^2$, $R^3$ and $R^4$ may be the same or different and each represent a halogen atom, substituted or unsubstituted alkyl group, substituted or unsubstituted aryl group, substituted or unsubstituted aralkyl group, substituted or unsubstituted alkylaryl group, substituted or unsubstituted alkenyl group, substituted or unsubstituted alkinyl group, substituted or unsubstituted aryloxy group, substituted or unsubstituted alicyclic group, substituted or unsubstituted heterocyclic group, substituted or unsubstituted allyl group, substituted or unsubstituted silyl group or alicyclic group, with the proviso that two or more of $R^1$, $R^2$, $R^3$ and R4 may be connected to each other to form a cyclic structure.

In the foregoing general formula (2), the cationic dye represented by $D^+$ acts as a spectral sensitizing dye. A preferred example of such a cationic dye is an organic cationic dye having an absorption peak in the wavelength range of not less than 500 nm, particularly from 550 nm to 1,100 nm.

Specific examples of the organic cationic dye include cationic methine dye, cationic carbonium dye, cationic quinonimine dye, cationic indoline dye, and cationic styryl dye. Preferred examples of the cationic methine dye include polymethine dye, cyanine dye, and azomethine dye, and more preferred examples thereof include cyanine, carbocyanine, dicarbocyanine, tricarbocyanine, and hemicyanine. Preferred examples of the cationic carbonium dye include triarylmethane dye, xanthene dye, and acridine dye, and more preferred examples include rhodamine. Preferred examples of the cationic quinonimine dye include azine dye, oxazine dye, thiazine dye, quinoline dye, and thiazole dye.

As the borate anion to be contained in the cationic dye there may be preferably used the same compound as listed with reference to the foregoing general formula (1).

Examples of the organic borate of cationic dye represented by the general formula (2) will be given below.

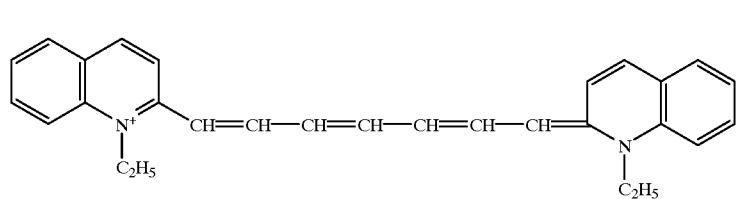
(1)
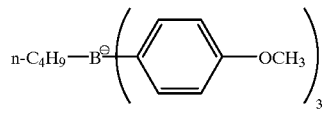
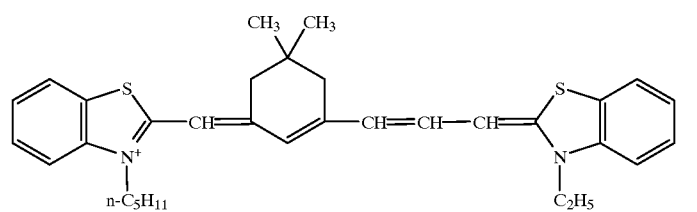
(2)
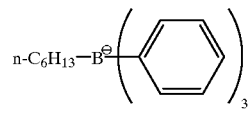
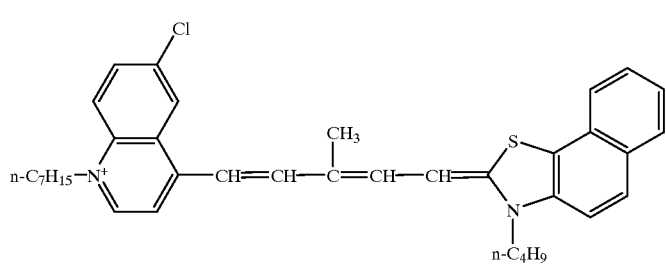
(3)
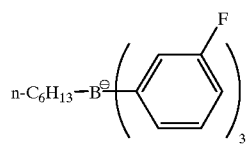
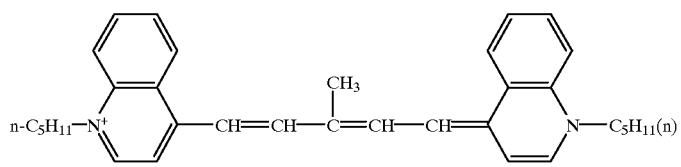
(4)
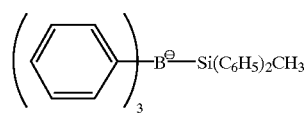
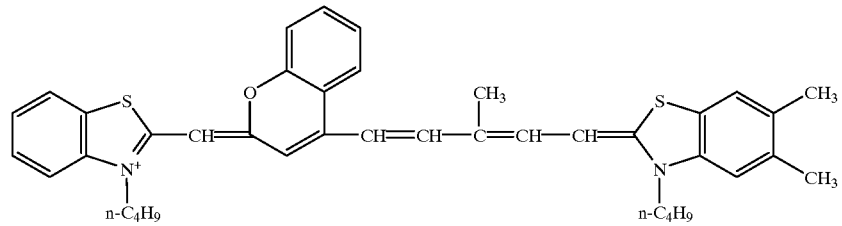
(5)

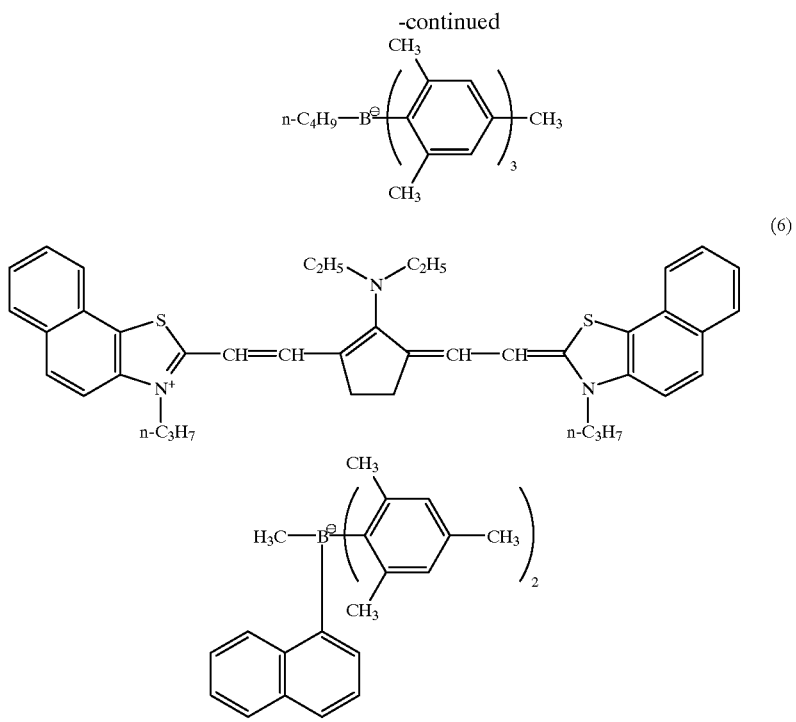

(6)

The amount of the photopolymerization initiator to be incorporated in the recording material is preferably from 0.01 to 20% by weight based on the total weight of the photo-setting composition which is present outside heat-sensitive microcapsule.

The recording material of the present invention may comprise as an auxiliary a compound having an active halogen group in its molecule represented by the following general formula (3) or (4) incorporated therein besides the foregoing photopolymerization initiator and spectral sensitizing dye.

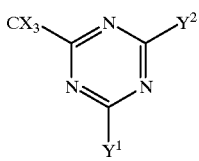

(3)

wherein X represents a halogen atom; $Y^1$ represents $—CX_3$, $—NH_2$, $—NHR$, $—NR_2$ or $—OR$ (in which R represents an alkyl group, a substituted alkyl group, an aryl group or a substituted aryl group; and $Y^2$ represents $—CX_3$, an alkyl group, a substituted alkyl group, an aryl group, a substituted aryl group or a substituted alkenyl group. The substituents on these substituted groups may be the group represented by the general formula (3) itself.

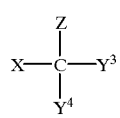

(4)

wherein X represents a halogen atom; $Y^3$ and $Y^4$ may be the same or different and each represent a hydrogen atom or a halogen atom; and Z represents a group represented by any one of the following general formulae:

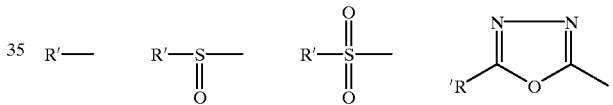

wherein $R^1$ represents a hydrogen atom, a halogen atom, an alkyl group, a substituted alkyl group, an aryl group, a substituted aryl group, a substituted alkenyl group, a heterocyclic group or a substituted heterocyclic group.

As the compound represented by the general formula (3) there may be preferably used one wherein $Y^1$ is $CX_3$.

Specific preferred examples of the compound represented by the general formula (3) include 2-phenyl-4,6-bis (trichloromethyl)-S-triazine, 2-(p-chlorophenyl)-4,6-bis (trichloromethyl)-S-triazine, 2-(p-methoxyphenyl)-4,6-bis (trichloromethyl)-S-triazine, 2,4,6-tris(trichloro methyl)-S-triazine, 2-(p-cyanophenyl)-4,6-bis(trichloro methyl)-S-triazine, and 2-(p-acetylphenyl)-4,6-bis(trichloro methyl)-S-triazine.

Specific examples of the compound represented by the general formula (4) include carbon tetrachloride, carbon tetrabromide, iodoform, p-nitro-α, α, α-tribromoacetophenone, ω, ω, ω-tribromoquinaldine, tribromomethylphenylsulfone, and trichloromethylphenylsulfone.

The amount of the compound represented by the general formula (3) or (4) to be incorporated in the recording material is preferably from 0.01 to 20 mol per mol of the spectral sensitizing dye (cationic dye).

The recording material of the present invention has a high sensitivity and is sensitive particularly to infrared light. The recording material of the present invention may further comprise as an auxiliary for accelerating the formation of latent image a reducing agent such as oxygen scavenger and chain transfer agent of active hydrogen donor and other compounds incorporated therein.

As the oxygen scavenger found useful as an auxiliary for accelerating the formation of latent image there may be used any of phosphine, phosphonate, phosphite, stannous salt and other compounds which can be easily oxidized by oxygen.

Examples of such an oxygen scavenger include N-phenylglycine, trimethylbarbituric acid, and N,N-dimethyl-2,6-diisopropylaniline.

The photo-setting composition of the third recording material comprises an electron attractive compound incorporated therein. If necessary, the photo-setting composition of the second recording material may comprise an electron attractive compound incorporated therein to enhance the color density of the image thus formed.

Examples of the electron attractive compound employable herein include phenol derivative, salicylic acid derivative, metal salt of aromatic carboxylic acid, acid clay, bentonite, novolak resin, metallized novolak resin, and metal complex. Examples of the phenol derivative include 2,2'-bis(4-hydroxyphenyl)propane, 4-t-butylphenol, 4-phenylphenol, 4-hydroxydiphenoxide, 1,1'-bis(3-chloro-4-hydroxyphenyl)cyclohexane, and 1,1'-bis(3-chloro-4-hydroxyphenyl)-2-ethylbutane. Examples of the salicylic acid derivative include 4-pentadecylsalicylic acid, 3,5-di($\alpha$-methylbenzyl)salicylic acid, 3,5-di(tert-octyl) salicylic acid, 5-octadecylsalicyclic acid, 5-$\alpha$-(p-$\alpha$-methylbenzylphenyl)ethylsalicyclic acid, 3-$\alpha$-methylbenzyl-5-tert-octylsalicylic acid, and 5-tetradecylsalicylic acid.

The amount of such an electron attractive compound to be incorporated in the photo-setting composition of the recording material is preferably from 5 to 1,000% by weight based on the electron donative colorless dye, i.e., from 5 to 1,000 parts by weight per 100 parts by weight of the electron donative colorless dye.

The photo-setting composition of the recording material of the present invention may further comprise as a photo-crosslinkable composition a photo-setting composition having vinyl polycinnamate, vinyl polycinnamylideneacetate, and $\alpha$-phenylmaleimide group. Such a photo-crosslinkable composition may be used as a photo-setting component.

The photo-setting composition may further comprise a thermal polymerization inhibitor incorporated therein as necessary for the purpose of inhibiting thermal polymerization and polymerization with time to enhance the stability.

Preferred examples of the thermal polymerization inhibitor include p-methoxyphenol, hydroquinone, t-butyl catechol, pyrogallol, 2-hydroxybenzophenone, 4-methoxy-2-hydroxybenzophenone, cuprous chloride, phenothiazine, chloranil, naphthylamine, $\beta$-naphthol, 2,6-di-t-butyl-p-cresol, nitrobenzene, dinitrobenzene, picric acid, and p-toluidine. The amount of such a thermal polymerization inhibitor to be incorporated in the photo-setting composition is preferably from about 0.001 to 5% by weight based on the total weight of the photo-setting composition.

The photo-setting composition is incorporated in the light- and heat-sensitive recording layer in the form of emulsion dispersion. Examples of the solvent to be used in the emulsion dispersion of the photo-setting composition include cottonseed oil, kerosine, aliphatic ketone, aliphatic ester, paraffin, naphthenic oil, alkylated biphenyl, chlorinated paraffin, diarylethane such as 1,1'-ditolylethane, phthalic acid alkylester such as dibutyl phthalate, phosphoric acid ester such as diphenyl phosphate, citric acid ester such as tributyl acetylcitrate, benzoic acid ester such as octyl benzoate, alkylamide such as diethyl laurylamide, acetic acid ester such as ethyl acetate, (meth)acrylic acid ester such as methyl acrylate, alkyl halide such as methylene chloride and carbon tetrachloride, methyl isobutyl ketone, $\beta$-ethoxyethyl acetate, and methyl cellosolve acetate. In particular, aliphatic esters and alkyl halides are desirable. More preferably, solvents having a water solubility of not more than 10 vol % are used.

Such a solvent is preferably used in an amount of from 1 to 500 parts by weight based on the weight of the photopolymerizable compound.

As the water-soluble high molecular compound to be used in the emulsion dispersion of the photo-setting composition there may be preferably used a compound which is dissolved in 25° C. water in an amount of not less than 5% by weight. Specific examples of such a compound include proteins such as gelatin, gelatin derivative and albumin, cellulose derivatives such as methyl cellulose, sugar derivatives such as starch (including modified starch), and synthetic high molecular compounds such as polyvinyl alcohol, hydrolyzate of styrene-maleic anhydride copolymer, carboxy-modified polyvinyl alcohol, polyacrylamide, saponification product of vinyl acetate-polyacrylic acid copolymer and polystyrenesulfonate. Particularly preferred among these compounds are gelatin and polyvinyl alcohol.

As the electron donative colorless dye to be incorporated in the microcapsule in the light- and heat-sensitive recording layer of the recording material there may be used any known suitable compound such as triphenylmethane phthalide-based compound, fluoran-based compound, phenothiazine-based compound, indolyl phthalide-based compound, leuco auramine-based compound, rhodamine lactam-based compound, triphenylmethane-based compound, triazine-based compound, spiropyran-based compound and fluorene-based compound.

Specific examples of the triphenylmethane phthalide-based compound include 3,3-bis(p-dimethylaminophenyl)-6-dimethylamino phthalide, and 3-(p-dimethylaminophenyl)-3-(2-methylindole-3-il)phthalide. Specific examples of the leuco auramine-based compound include N-halophenyl-leucoauramine, and N-2,4,5-trichlorophenylleucoauramine. Specific examples of the rhodaminelactam-based compound include rhodamine-B-anilinolactam, and rhodamine-(p-nitrilo)lactam. Specific examples of the fluoran-based compound include 2-(dibenzylamino)fluoran, 2-anilino-3-methyl-6-diethylamino fluoran, and 2-anilino-3-methyl-6-N-methyl-N-cyclohexylamino fluoran. Specific examples of the phenothiazine-based compound include benzoyl leucomethylene blue, and p-nitrobenzyl leucomethylene blue. Specific examples of the spiropyran-based compound include 3-methyl-spiro-dinaphthopyran, and 3,3'-dichloro-spiro-dinaphthopyran.

For the details of electron donative colorless dye for cyan, magenta and yellow, if the recording material of the present invention is used as a full-color recording material, reference can be made to U.S. Pat. No. 4,900,149. For the details of yellow-developing dye, reference can be made to U.S. Pat. No. 4,800,148. For the details of cyan-developing dye, reference can be made to JP-A-63-53542.

The microcapsulization of the electron donative colorless dye can be accomplished by any method known in the art.

Examples of these methods include a method utilizing the coacervation of a hydrophilic wall-forming material disclosed in U.S. Pat. No. 2,800,457, an interfacial polymerization method disclosed in JP-B-42-771 (The term "JP-B"as used herein means an "examined Japanese patent publication"), a method involving the deposition of a polymer disclosed in U.S. Pat. No. 3,660,304, a method using an isocyanate polyol wall material disclosed in U.S. Pat. No. 3,796,669, a method using an isocyanate wall material disclosed in U.S. Pat. No. 3,914,511, and a method using a urea formaldehyde-resorcinol wall-forming material disclosed in U.S. Pat. No. 4,089,802. A method is preferably used which comprises emulsifying a core material, and then forming a high molecular film thereon as a microcapsule wall.

In particular, a microcapsulization method involving the polymerization of a reactant from the inside of oil drop is desirable because a recording material excellent in storage properties having capsules with a uniform grain size can be obtained in a short period of time.

For example, if a polyurethane is used as a capsule wall material, a polyvalent isocyanate and a second material (e.g., polyol, polyamine) which reacts with the polyvalent isocyanate to form a capsule wall are added to an oil liquid. The mixture is then emulsion-dispersed in water. The emulsion dispersion thus obtained is then heated so that a high molecular compound forming reaction occurs at the interface of oil drop to form a microcapsule wall. During the procedure, the oil liquid may comprise a low boiling high dissolving auxiliary solvent incorporated therein.

As the polyvalent isocyanate to be used herein there may be used any polyvalent isocyanate used for the preparation of known urethane resin such as m-phenylene diisocyanate, 2,6-tolylene diisocyanate, 2,4-tolylene diisocyanate, diphenylmethane-4,4-diisocyanate, xylylene-1,4-diisocyanate, 4,4'-diphenylpropane diisocyanate, trimethylene diisocyanate and hexamethylene diisocyanate. Such a polyvalent isocyanate can also react with water to form a high molecular compound.

As the polyol there may be used a polyvalent aliphatic or aromatic alcohol, hydroxypolyester, hydroxypolyalkylene ether or the like. Specific examples of the polyol include various polyols used for the preparation of known urethane such as ethylene glycol, 1,3-propanediol, 1,4-butanediol, 1,5-pentanediol, 1,6-hexanediol, propylene glycol, 2,3-dihydroxybutane, 1,2-dihydroxybutane, 2,5-hexanediol, 3-methyl-1,5-pentanediol and dihydroxy cyclohexane. The amount of the polyol to be used is preferably from about 0.02 mols to 2 mols of hydroxy group per mol of isocyanate group.

Examples of the polyamine employable herein include ethylenediamine, trimethylenediamine, tetramethylenediamine, pentamethylenediamine, hexamethylenediamine, p-phenylenediamine, m-phenylenediamine, piperazine, derivative thereof, 2-hydroxytrimethylenediamine, diethylenetriamine, triethylenetriamine, triethylenetetramine, tetraethylene pentamine, and amine adduct of epoxy compound.

The microcapsule can be also prepared by a water-soluble high molecular compound. The water-soluble high molecular compound employable herein may be any of water-soluble anionic high molecular compound, nonionic high molecular compound and amphoteric high molecular compound.

As the anionic high molecular compound there may be used one having —COO— group, —SO$_2$— group or the like. Specific examples of such an anionic high molecular compound include gum arabic, alginic acid, sulfated starch, sulfated cellulose, gelatin derivative such as phthalated gelatin, acrylic acid-based copolymer, methacrylic acid-based copolymer, vinylbenzenesulfonic acid-based copolymer and carboxy-modified polyvinyl alcohol. Specific examples of the nonionic high molecular compound include polyvinyl alcohol, hydroxyethyl cellulose, and methyl cellulose. Specific examples of the amphoteric compound include gelatin. Particularly preferred among these water-soluble high molecular compounds are gelatin, gelatin derivative, and polyvinyl alcohol.

The water-soluble high molecular compound is used in the form of aqueous solution having a concentration of from 0.01 to 10% by weight.

In the recording material of the present invention, the average gain grain size of the microcapsule is not more than 20 $\mu$m, preferably not more than 5 $\mu$m from the standpoint of resolution. If the average grain size of the microcapsule is too small, the surface area of the microcapsule per unit solid content is too great, requiring a large amount of the wall-forming material. Therefore, the average grain size of the microcapsule is preferably not less than 0.1 $\mu$m.

The electron donative colorless dye may be present in the form of solution or solid in the microcapsule.

If it is desired to cause the electron donative colorless dye to be present in the form of solution, the dye may be capsulized in the form of solution in a solvent. The amount of the solvent to be used herein is preferably from 1 to 500 parts by weight based on 100 parts by weight of the electron donative colorless dye. As the solvent to be used for capsulization there may be used the same solvent as used for the emulsion of the photo-setting composition. A volatile solvent such as acetic acid ester-based solvent may be used as the auxiliary solvent which can be used in combination for the dissolution of the electron donative colorless dye during microcapsulization.

The recording material of the present invention may further comprise various layers such as protective layer and interlayer besides the light- and heat-sensitive layer. The protective layer preferably comprises a matting agent incorporated therein.

Examples of the matting agent employable herein include inorganic particulate material such as particulate silica, magnesium oxide, barium sulfate and strontium sulfate, particulate resin such as particulate polymethyl methacrylate, polyacrylonitrile and polystyrene, and particulate starch such as particulate carboxy and corn starch. Particularly preferred among these matting agents are particulate polymethyl methacrylate and silica. As particulate silica there may be used Siloid AL Series (produced by FUJI-DEVISON CHEMICAL LTD.).

The grain size of the matting agent is preferably from 1 $\mu$m to 20 $\mu$m. The amount of the matting agent is preferably from 2 mg/m$^2$ to 500 mg/m$^2$.

The light- and heat-sensitive layer, interlayer and protective layer of the recording material of the present invention each preferably comprise a hardener incorporated therein. In particular, the protective layer preferably comprises a hardener incorporated therein to reduce the tackiness thereof.

As such a hardener there may be used a gelatin hardener for use in the preparation of photographic light-sensitive material. Specific preferred examples of the gelatin hardener include chrome alum, zirconium sulfate, boric acid, 1,3,5-triacryloyl-hexahydro-s-triazine, 1,2-bisvinylsulfonylmethane, 1,3-bis(vinylsulfonylmethyl)propanol-2, bis($\alpha$-vinylsulfonylacetamide)ethane, 2,4-dichloro-6-hydroxy-s-triazine sodium salt, and 2,4,6-triethyleneimino-s-triazine.

The amount of the hardener to be incorporated in each layer is preferably from 0.5 to 5% by weight based on the weight of the binder incorporated therein.

The protective layer may comprise colloidal silica incorporated therein to reduce the tackiness thereof.

Examples of colloidal silica employable herein include Snowtex 20, Snowtex 30, Snowtex C, Snowtex O and Snowtex N (produced by Nissan Chemical Industries, Ltd.). The amount of colloidal silica to be incorporated in the protective layer is preferably from 5 to 80% by weight based on the weight of the binder.

The protective layer may comprise a fluorescent brightening agent for enhancing the whiteness of the resulting recording material or a blue dye as a bluing agent incorporated therein.

In order to use the recording material of the present invention as a multi-color recording material, the recording material can have a multi-layer structure which comprises plural layers containing the photo-setting compositions sensitive to light having different wavelength and the microcapsules containing electron donative colorless dyes which develop different hues, and an interlayer containing a filter dye may be provided interposed between the light- and, heat-sensitive layers.

The interlayer is mainly composed of a binder and a filter dye. The interlayer may comprise additives such as hardener and polymer latex incorporated therein as necessary.

The filter dye to be incorporated in the recording material of the present invention may be subjected to emulsion dispersion by an oil-in-water dispersion method or polymer dispersion method, and then incorporated in the desired layer, particularly interlayer. In the oil-in-water dispersion method, the filter dye is dissolved in either or a mixture of a high boiling organic solvent, e.g., having a boiling point of not lower than 175° C. and a so-called auxiliary solvent having a boiling point of from 30° C. to 160° C. The solution thus obtained is then finely dispersed in water or an aqueous medium such as aqueous solution of gelatin and aqueous solution of polyvinyl alcohol in the presence of a surface active agent.

For the details of procedure of latex dispersion and examples of latexes for hardening and impregnation, reference can be made to U.S. Pat. No. 4,199,383. Preferred examples of latex employable herein include a copolymer latex of an acrylic acid (methacrylic acid) ester such as ethyl acrylate with an acid monomer such as acrylic acid.

As the binder to be incorporated in the various layers such as protective layer, light- and heat-sensitive layer and interlayer of the recording material of the present invention there may be used a water-soluble high molecular compound which can be used for the emulsion dispersion of photo-setting composition or the capsulization of electron donative colorless dye as well as polystyrene, polyvinyl formal, polyvinyl butyral, polyvinyl alcohol, acrylic resin such as polymethyl acrylate, solvent-soluble high molecular compound such as phenol resin, ethyl cellulose, epoxy resin and urethane resin or high molecular latex thereof. Preferred among these binders are gelatin and polyvinyl alcohol.

The various layers of the recording material of the present invention may comprise various surface active agents incorporated therein for the purpose of facilitating coating and emulsion dispersion, inhibiting electrification and adhesion and improving slipperiness.

As the surface active agent there may be used a nonionic surface active agent such as saponin, polyethylene oxide, derivative thereof, alkylsulfonate, alkylsulfuric acid ester, N-acyl-N-alkyltauric acid and sulfosuccinic acid ester, an anionic surface active agent, an amphoteric surface active agent such as alkylbetain and alkylsulfobetain or a cationic surface active agent such as aliphatic or aromatic quaternary ammonium salt as necessary.

The various layers of the recording material may comprise an anti-irradiation or anti-halation dye, an ultraviolet absorbing agent, a plasticizer, a fluorescent brightening agent, a coating aid, a hardener, antistatic agent or a lubricant incorporated therein besides the foregoing additives as necessary.

The recording material having such a characteristic image-forming layer or light- and heat-sensitive recording layer can be prepared by a process which comprises preparing coating solutions (emulsions) containing various layer components, optionally using a solvent, applying the coating solutions to a support by a known method, and then drying the coated material.

As the solvent there may be used any solvent for use in the preparation of recording material. Specific examples of the solvent employable herein include water, alcohol such as ethanol and isopropanol, halogenic solvent such as ethylene chloride, ketone such as cyclohexanone and methyl ethyl ketone, ester such as methyl cellosolve acetate and ethyl acetate, toluene, and xylene. These solvents may be used in admixture as necessary. For the purpose of improving the applicability or antistatic effect of the coating solution, the coating solution may comprise various surface active agents such as nonionic, anionic, cationic and fluorine-based surface active agents incorporated therein.

The application of the coating solution can be accomplished by means of blade coater, rod coater, knife coater, roll doctor coater, reverse roll coater, transfer roll coater, gravure coater, kiss-roll coater, curtain coater or the like. Needless to say, the coated amount of the various coating solutions need to be adjusted so that it reaches a desired value after dried.

The support constituting the recording material of the present invention is not specifically limited. Various materials used for ordinary recording materials can be used. Specific examples of these materials include resin films such as polyester film, polyethylene terephthalate film, polyethylene naphthalate film, cellulose nitrate film, cellulose ester film, polyvinyl acetal film and polycarbonate film, various metals such as aluminum, zinc and copper, glass, and paper.

The recording material A thus prepared is formed into a sheet. In general, these sheets are collected into a unit stack (bundle) of 100 sheets or the like. The stack is then packaged by a bag or band to give a package 80.

The recording material A which has been supplied into the pair of feed rollers 30 from the loading zone 22 is then passed to the downstream crosswise sliding zone 14 by the pair of conveyor rollers 34 and 36 while being guided by the conveyor guides 38, 40 and 42. On the other hand, the recording material A which has been supplied into the pair of feed rollers 32 from the loading zone 24 is then passed to the downstream crosswise sliding zone 14, by the pair of conveyor rollers 36 while being guided by the conveyor guides 40 and 42.

At the crosswise sliding zone 14, the recording material A is positioned crosswise to the conveying direction so that it is properly positioned with respect to the main scanning direction in the downstream imagewise exposure zone 16 before being conveyed to the downstream imagewise exposure zone 16 by a pair of conveying rollers 44.

The side registration in the crosswise sliding zone 14 (sideway register section) is not specifically limited. For example, a method may be used using a registration plate which positions the recording material A in contact with one longitudinal edge face of the recording material A and a pressing means such as roller which presses the recording material A crosswise to bring the edge face of the recording material A into contact with the registration plate. Alternatively, a method may be used using a guide plate which can move according to the crosswise size of the recording material A to control the crosswise direction of conveyance of the recording material A and bring the edge face of the recording material A into contact with the registration plate.

The recording material A which has been supplied into the crosswise sliding zone 14 is positioned crosswise to the conveying direction as mentioned above, and then passed to the imagewise exposure zone 16 by the pair of conveying rollers 44.

At the imagewise exposure zone 16, the recording material A is imagewise exposed to light. In the present invention, the imagewise exposure zone 16 has the following constitution.

The imagewise exposure zone 16 comprises an exposure unit 46 and a subsidiary scanning and conveying means 48.

Figure 2:
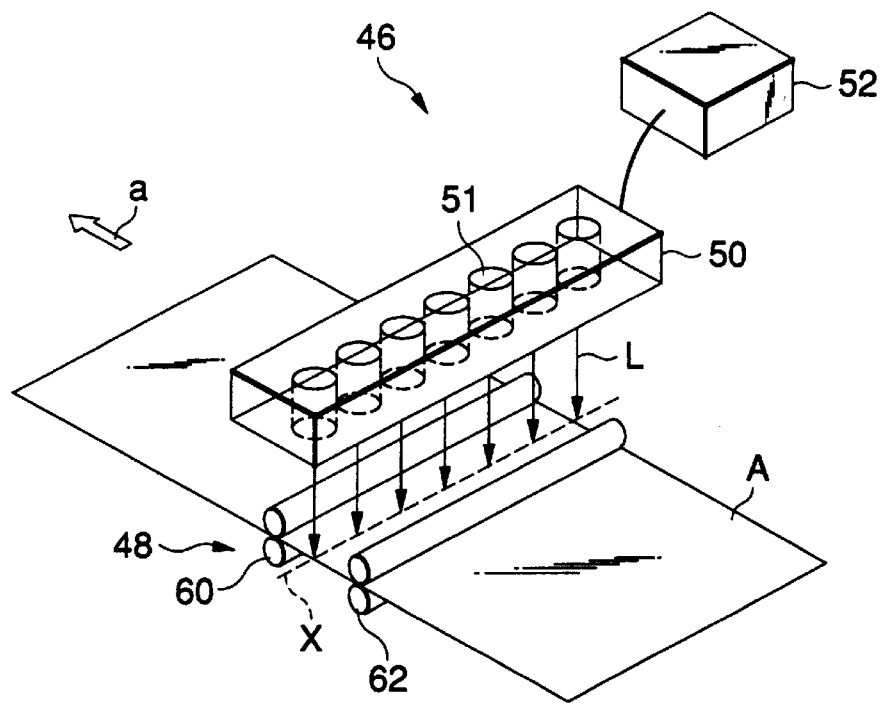
FIG. 2 is a schematic diagram illustrating an example of an exposure unit used in the image forming apparatus of FIG. 1.

The exposure unit 46 is provided with a light source which emits incoherent light L. The light source comprises, e.g., an LED array 50, optical components (not shown) such as lens, and a recording controller 52 as shown in FIG. 2.

LED array 50 comprises a plurality of LED elements 51 arranged in matrix form crosswise to the running direction of the recording material A (direction perpendicular to the paper in FIG. 1). The light emitted by the LED element 51 is an incoherent light which is less coherent than laser beam. The interval between LED elements 51 and the number of LED elements 51 are, of course, predetermined depending on the width of the largest recording material A which can be applied to the image forming apparatus 10 and the desired image density. Further, LED array 50 is arranged such that the light emitted by the LED element 51 hits the recording material A at a desired recording position X through the optical component (not shown) such as lens. As LED element 51 there may be used GaAlAs (emission wavelength: 740 nm).

The recording controller 52 independently controls the emission timing of the various LED elements 51 and the amount of light emitted from these LED elements 51 (emission time and/or emission intensity) in accordance with image data, making it possible to effect image recording at multiple gradation.

The subsidiary scanning and conveying means 48 uses a pair of conveying rollers 60 and 62 to carry the recording material A in the subsidiary scanning direction (arrow a in FIG. 2) perpendicular to the LED array 50. At the same time with the conveyance of the recording material A, the LED array 50 is operated. As a result, the recording material A is two-dimensionally exposed to light so that a latent image is sequentially formed therein.

The exposure unit 46 is not specifically limited so far as it is arranged to emit incoherent light onto the recording material A.

A fluorescent substance dot array, an edge face emission type EL array, a plasma image bar or the like may be used instead of the foregoing LED array 50.

In a fluorescent substance dot array, a thermoelectron emitted from a heating filament (cathode) excites the fluorescent substance on an anode to emit light. A plurality of anodes are arranged crosswise to the running direction of the recording material A as in the LED array 50.

An edge face emission type EL array comprises edge face EL elements having a dielectric layer, a thin film light-emitting layer, and a dielectric layer laminated on a metal electrode deposited on a glass substrate, and an upper electrode layer on the dielectric layer, which are arranged as in the LED array 50. In operation, when a voltage is applied across the two electrodes, the light-emitting layer is excited, causing the edge face of EL element to emit light.

A plasma image bar comprises a gas encapsulated between glass substrates. A cathode and an anode are arranged with the glass substrates provided interposed therebetween. In operation, when a voltage is applied across the two electrodes, glow discharge occurs to generate negative glow light emission. These electrodes are arranged as in the LED array 50.

Figure 3:
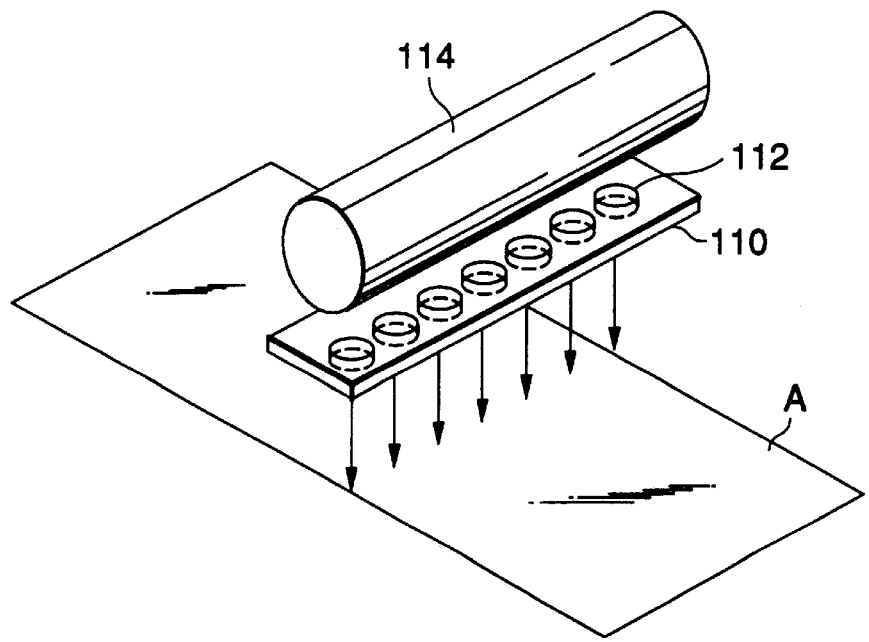
FIG. 3 is a schematic diagram illustrating a modification of the exposure unit of FIG. 3, wherein the reference numeral 10 indicates an image forming apparatus, the reference numeral 12 indicates a feed zone, the reference numeral 14 indicates a crosswise sliding zone, the reference numeral 16 indicates an imagewise exposure zone, the reference numeral 18 indicates a heat development zone, the reference numeral 46 indicates an exposure unit, the reference numeral 50 indicates an LED array, the reference numeral 51 indicates an LED element, the reference numeral 110 indicates a shutter, the reference numeral 114 indicates a light source, and the symbol A indicates a recording material.
Figure 4:
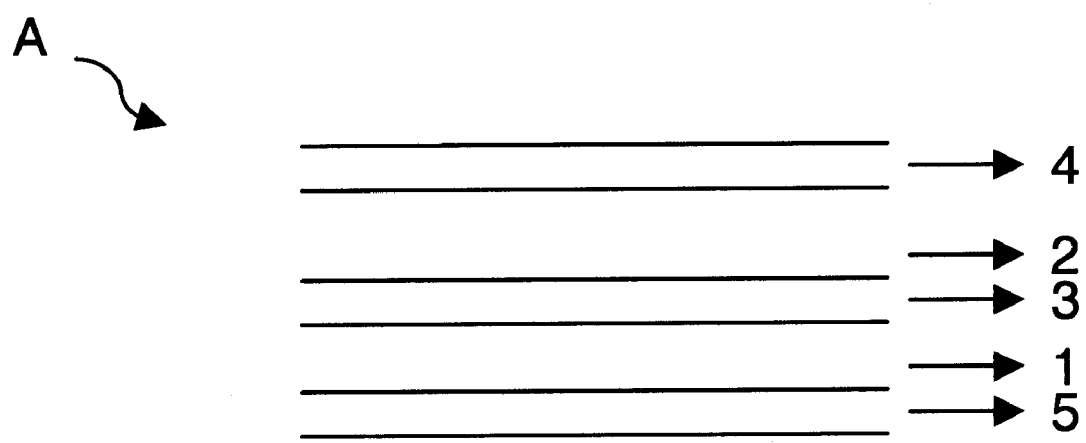
FIG. 4 shows an example of photographic material A for processing in the image forming apparatus of FIG. 1 or the exposure unit of FIGS. 2 and 3, including support 1, photosensitive emulsion layer (recording layer) 2, undercoating layer 3, surface protective layer 4 and back protective layer 5.

These light sources comprise a plurality of dot light sources arranged in a matrix pattern. On the other hand, as shown in FIG. 3, it is possible to use a light source 114 which emits light uniformly and in the form of a plane and control the light which reaches the surface of the recording material A by means of a shutter 110.

As the shutter 110 there may be used a liquid crystal shutter. By separately controlling the amount of light transmitted by each liquid crystal cell (reference numeral 112), multiple gradation can be realized. Alternatively, a transmission ferroelectric ceramic array may be used. The transmission ferroelectric ceramic array utilizes birefriengence by secondary electroptical effect of a ferroelectric ceramic such as PLZT to control the transmission of light. The transmission ferroelectric ceramic array comprises a ferroelectric ceramic array arranged between two polarizing plates the polarization of which cross each other.

The light source 114 is not specifically limited so far as it emits incoherent light that meets the required photosensitive properties of the recording material A.

Any other shutters may be used without any restriction so far as they can control the transmission of light in response to image data.

In the imagewise exposure zone 16 having the foregoing constitution, the recording material A is irradiated with incoherent light. Interference sparingly occurs in the recording material A, causing no interference band.

The foregoing imagewise exposure zone 16 is designed to effect monochromatic image recording and thus has only one light source. If the image forming apparatus is used for color image recording, three kinds of light sources having emission wavelengths corresponding to the R (red), G (green) and B (blue) spectral sensitivity of the color light-sensitive material can be arranged.

The recording material A in which a latent image has thus been formed in the imagewise exposure zone 16 is then passed to the heat development zone 18 by a pair of conveying rollers 64 and 66.

The heat development zone 18 heats the recording material A so that the latent image formed therein is heat-developed to form a visible image. The heat development zone 18 basically comprises a heating drum 68 and an endless belt 70.

The heating drum 68 comprises a heating light source such as halogen lamp or a heat source such as heater provided thereinside. In this arrangement, the heating drum 68 is heated to and kept at a temperature depending on the heat development temperature of the recording material A. The heating drum 68 rotates around an axis 68a to carry the recording material A under pressure by an endless belt 70. During this procedure, the recording material A is heat-developed when brought into contact with the heating drum 68.

The endless belt 70 is made of a metal such as iron, copper and stainless steel and a heat-resistant material such as polycarbonate film, ethylene fluoride resin film, silicone rubber and composite fluororesin film. The endless belt 70 is tensed by rollers 74a, 74b, 74c, and 74d so that it goes around the heating drum under pressure. Dust on the surface of the endless belt 70 is removed by a tacky roller 78 so that the endless belt 70 is cleaned. In FIG. 1, reference numerals 72 and 76 mean a release nail and a transport roller, respectively.

In the heat development zone 18, a heater plate can be arranged instead of the heating drum 68.

The recording material A which has been thus heat-developed is then distributed into a tray 79.

The present invention will be further described in the following examples, but the present invention should not be construed as being limited thereto.

EXAMPLE 1

A photosensitive emulsion layer having silver halide grains with an average grain size of 0.15 μm uniformly dispersed therein was formed on a PET film having a thickness of 80 μm in an amount such that the coated amount of silver reached 2.8 g/m² to prepare a recording material. The emulsion layer was then measured by means of a GaAlAs LED element having an emission wavelength of 740 nm. The absorbance was 0.4.

The recording material thus prepared was then processed by an image forming apparatus provided with an LED array (see FIG. 2) comprising GaAlAs LED elements to form an image thereon. The image thus formed has a high quality free of defects.

For comparison, the same recording material was processed by a laser beam (wavelength: 630 nm) as a light source to form an image thereon. The image thus formed showed an image quality drop due to interference band.

EXAMPLE 2

A recording material was prepared as follows.
Preparation of organic silver salt dispersion A
40 g of behenic acid, 7.3 g of stearic acid and 500 ml of water were stirred at a temperature of 90° C. for 15 minutes. To the solution thus obtained was then added 187 ml of a 1N NaOH in 15 minutes. To the mixture was then added 61 ml of a 1N aqueous solution of silver nitrate. The mixture was then heated to a temperature of 50° C. To the solution was then added 124 ml of a 1N aqueous solution of silver nitrate in 2 minutes. The mixture was then stirred for 30 minutes. Thereafter, the solid content was withdrawn by filtration with suction, and then washed with water until the conductivity of the filtrate reached 30 μS/cm.

The solid content thus obtained was then used undried as a wet cake. To the wet cake in an amount of 100 g as calculated in terms of dry solid content were then added 10 g of a polyvinyl alcohol (trade name: PVA-205), and water was added thereto to make 500 g. The mixture was then subjected to predispersion by a homomixer.

The stock solution thus predispersed was then processed three times by a disperser (Type M-110S-EH microfluidizer provided with G102 interaction chamber, produced by Microfluidex International Corporation) at a controlled pressure of 1,750 kg/cm² to prepare an organic silver microcrystalline dispersion A having a volume weighted average grain size of 0.93 μm.
Preparation of silver halide grains A
22 g of phthalated gelatin and 30 mg of potassium bromide were dissolved in 700 ml of water. The pH value of the solution was then adjusted to 5.0 at a temperature of 40° C. To the solution were then added 159 ml of an aqueous solution containing 13.6 g of silver nitrate and an aqueous solution of potassium bromide by a controlled double jet process in 10 minutes while the pAg value thereof was being kept at 7.7. Subsequently, to the solution were added 475 ml of an aqueous solution containing 55.4 g of silver nitrate and an aqueous solution containing 8 μmol/l of dipotassium hexachloroiridiumate and 1 mol/l of potassium bromide by a controlled double jet process in 30 minutes while the pAg value thereof was being kept at 7.7. Thereafter, the pH value of the solution was lowered to cause cohesion and sedimentation so that it was desalted. To the emulsion was then added 0.1 g of phenoxyethanol so that the pH value and pAg value thereof were adjusted to 5.9 and 8.0, respectively. As a result, cubic silver halide grains having an average grain size of 0.07 μm, a projected area diameter variation coefficient of 8% and a (100) plane ratio of 86% was obtained.

The silver halide grains A thus obtained were heated to a temperature of 60° C. where sodium thiosulfate, 2,3,4,5,6-pentafluorophenyl diphenylphosphine selenide, a Tellurium Compound 1, chloroauric acid and thiocyanic acid were then added thereto in an amount of 85 μmols, 11 μmols, 0.2 μmols, 3.3 μmols and 230 μmols per mol of silver. The mixture was then ripened for 120 minutes.

Thereafter, the mixture was allowed to cool to a temperature of 40° C. where Sensitizing Dye A was then added thereto in an amount of $3.5 \times 10^{-4}$ mols per mol of silver halide with stirring. After 5 minutes, to the mixture was added Compound A in an amount of $4.6 \times 10^{-3}$ mols per mol of silver halide. The mixture was then stirred for 5 minutes. The mixture was then rapidly cooled to prepare silver halide grains A.

Sensitizing Dye A, Compound A and Tellurium Compound 1 used above will be given below.

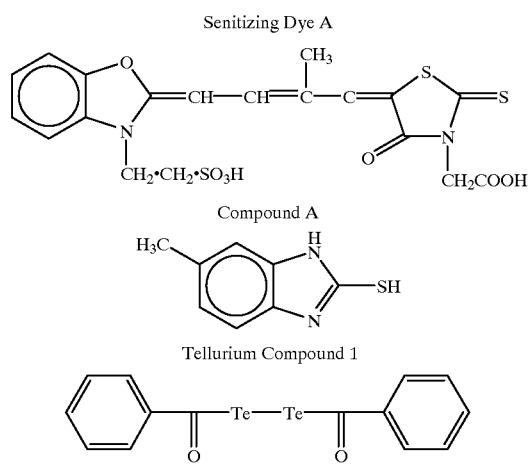

Preparation of starting material solid particulate dispersion

Solid particulate dispersions of tetrachlorophthalic acid, 4-methylphthalic acid, 1,1-bis(2-hydroxy-3,5-dimethylphenyl)-3,5,5-trimethylhexane, phthalazine and tribromomethylphenyl sulfone were prepared. In some detail, to 2.5 g of tetrachlorophthalic acid were added 0.81 g of hydroxypropylmethyl cellulose and 94.2 me of water. The mixture was thoroughly stirred to obtain a slurry which was then allowed to stand for 10 hours. Thereafter, 100 ml of zirconia beads having an average diameter of 0.5 mm was prepared, and then put into a vessel with the slurry. The slurry was then subjected to dispersion by the same disperser as used in the preparation of the organic silver microcrystalline dispersion for 5 hours to obtain a solid particulate dispersion of tetrachlorophthalic acid. The solid particulate dispersion thus obtained had a grain diameter of not greater than 3.0 μm in a proportion of 70% by weight based on the total weight thereof. For the solid particulate dispersion of the other starting materials, the amount of the dispersant to be used and the dispersion time required to obtain the desired average grain diameter were properly changed.

Preparation of polymer particulate dispersion containing dye

A solution of 2 g of Dye A shown below and 6 g of a 85:15 methyl methacrylate-methacrylic acid copolymer in 40 ml of ethyl acetate was heated to a temperature of 60° C. to make a solution. The solution was then added to 100 ml of an aqueous solution containing S g of a polyvinyl alcohol. The mixture was then subjected to fine dispersion at 12,000 rpm by a high speed agitator (homogenizer produced by Nippon Seiki Co., Ltd.) for 5 minutes to obtain a polymer particulate emulsion dispersion P having an average grain diameter of 0.3 μm.

Dye A

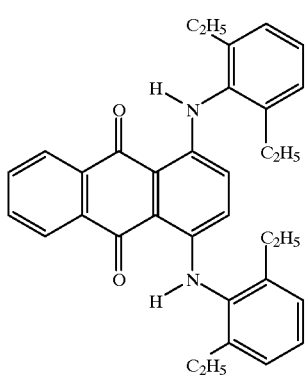

Preparation of emulsion layer coating solution 1

To the organic silver salt dispersion A which had previously been prepared was then added the silver halide grains A in an amount of 10 mol % per mol of silver and the binder and constituents for developer shown below to prepare an emulsion coating solution 1.

| Binder | |
|---|---|
| Rackstar 3307B (SBR latex produced by DAINIPPON INK & CHEMICALS, INC.) | 430 g |
| Constituents for Developer | |
| Tetrachlorophthalic acid | 5 g |
| 1, 1-Bis(2-hydroxy-3, 5-dimethylphenyl)-3, 5, 5-trimethylhexane | 98 g |
| Phthalazine | 9.2 g |
| Tribromomethyl phenyl sulfone | 12 g |
| 4-Methylphthalic acid | 7 g |

Dye

Dye A (polymer particulate dispersion containing 4 g of the foregoing dye)

Rackstar 3307B used above is a polymer latex of a styrene-butadiene copolymer having an equilibrium moisture content of 0.6% by weight at 25° C. and 60% RH. The disperse grains have an average diameter of from about 0.1 to 0.15 μm.

Preparation of coating solution for protecting emulsion surface

To 10 g of inert gelatin were added 0.26 g of Surface Active Agent A shown below, 0.09 g of Surface Active Agent B shown below, 0.9 g of particulate silica (average grain diameter: 2.5 μm), 0.3 g of 1,2-(bisvinylsulfonylacetamide)-ethane and 64 g of water to prepare a surface protective layer coating solution.

Surface Active Agent A

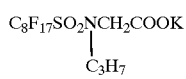

Surface Active Agent B

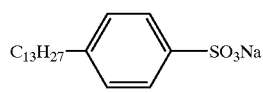

Preparation of Dye Dispersion

To 35 g of ethyl acetate was added 0.8 g of Dye B shown below to make a solution. To the solution thus obtained was then added 85 g of a 6 wt % solution of polyvinyl alcohol (PVA-217) which had been previously prepared. The mixture was then stirred by a homogenizer for 5 minutes. Thereafter, the mixture was desolvated to evaporate ethyl acetate. The residue was then diluted with water to prepare a dye dispersion.

Dye B

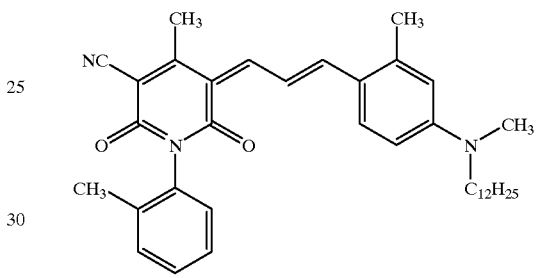

Preparation of solid base particulate dispersion

To 26 g of the solid base shown below was added 234 g of a 2wt % aqueous solution of polyvinyl alcohol (PVA-217). The mixture was thoroughly stirred to obtain a slurry which was then allowed to stand for 10 hours. Thereafter, 100 mg of zirconia beads having an average diameter of 0.5 mm was prepared, and then put in a vessel with the slurry. The slurry was then subjected to dispersion by a disperser (¼G sandgrinder mill, produced by Aimex Co., Ltd.) for 5 minutes to obtain a solid base particulate dispersion.

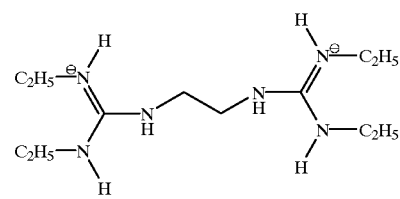

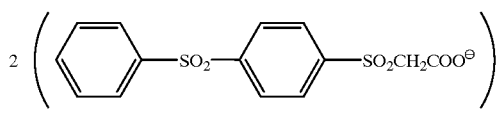

Preparation of back layer coating solution

To 68 g of a 10% gelatin solution were added 20 g of the dye dispersion which had previously been prepared, 20 g of the solid base particulate dispersion and 35 g of water to prepare a back layer coating solution.

Preparation of back protective layer coating solution

To 10 g of inert gelatin were added 0.26 g of Surface Active Agent A, 0.09 g of Surface Active Agent B, 0.3 g of 1, 2-(bisvinylsulfonylacetamide)ethane, 0.4 g of Sildex H121 (spherical silica produced by Dokai Kagaku K.K.;

average size: 12 μm) and 64 g of water to prepare a back protective layer coating solution.

Preparation of undercoating layer coating solution

To 880 ml of water were added 100 mg of a styrene-butadiene copolymer latex (concentration: 30 wt %; average grain diameter: 210 nm; styrene/butadiene/acrylic acid=58/29/3 (by weight)), 1.0 g of a particulate polymethyl methacrylate (average grain diameter: 2.5 μm), 0.5 g of a particulate polystyrene (average grain diameter: 2.5 μm) and 20 mg of Surface Active Agent B (1 wt %) to prepare an undercoating layer coating solution.

Preparation of Undercoated Support

The foregoing undercoating layer coating solution was applied to one side of a 180 μm thick biaxially-oriented polyethylene terephthalate support which had been tinted with a blue dye by a bar coater to a dry thickness of 0.3 μm (wet coated amount: 10 cc/m$^2$), and then dried at a temperature of 180° C. for 5 minutes to prepare an undercoated support.

The emulsion which had been prepared was applied to the 175 μm thick polyethylene terephthalate support (which had been tinted with a blue dye) in an amount of 2.2 g/m$^2$ as calculated in terms of silver. The emulsion surface protective layer coating solution which had been prepared was then applied to the emulsion-coated surface of the support in an amount of 1.8 g/m$^2$ as calculated in terms of gelatin. The coated material was then dried. The back layer coating solution which had been prepared was then applied to the support on the side thereof opposite the emulsion layer in an amount of 56 mg/m$^2$ as calculated in terms of Dye B. The back protective layer coating solution which had been prepared was applied to the back layer side of the support in an amount of 1.8 g/m$^2$ as calculated in terms of gelatin to prepare a recording material.

The recording material thus obtained was then processed by an image forming apparatus provided with an LED array (see FIG. 2) comprising a GaAlAsLED element to form an image thereon. The image thus formed had a high quality free of defects.

As mentioned above, the image forming apparatus according to the present invention gives no uneven exposure due to interference band and thus can provide a high quality image.

While the invention has been described in detail and with reference to specific embodiments thereof, it will be apparent to one skilled in the art that various changes and modifications can be made therein without departing from the spirit and scope thereof.

What is claimed is:

1. An image forming apparatus for forming an image on a recording material, which comprises a latent image forming means for irradiating said recording material with incoherent light to form a latent image, said latent image being rendered visible by heating; said recording material having light interference and comprising a support and a photosensitive emulsion layer provided on at least one side of the support, wherein said photosensitive emulsion layer comprises silver halide grains having an average grain size of not more than 0.2 μm and has an absorbance with respect to said incoherent light within an exposure wavelength range of not more than 0.5.

2. The image forming apparatus of claim 1, wherein said support has a thickness of not less than 50 μm.

3. The image forming apparatus of claim 1, wherein said photosensitive emulsion layer is coated on the support in an amount of not more than 3 g/m$^2$ as calculated in terms of silver.

4. The image forming apparatus of claim 1, wherein said latent image forming means comprises a light irradiating means having incoherent light emitting sources arranged in a main scanning direction.

5. The image forming apparatus of claim 1, wherein said latent image forming means comprises a light source for emitting incoherent light and a light shielding means for controlling the emission of incoherent light.

6. A recording system comprising an image forming apparatus and a recording material,
said apparatus comprising a latent image forming means for irradiating said recording material with incoherent light to form a latent image, said latent image being rendered visible by heating,
said recording material having light interference and comprising a support and a photosensitive emulsion layer provided on at least one side of the support, wherein said photosensitive emulsion layer comprises silver halide grains having an average grain size of not more than 0.2 μm and has an absorbance with respect to said incoherent light within an exposure wavelength range of not more than 0.5.

7. The recording system of claim 6, wherein said support has a thickness of not less than 50 μm.

8. The recording system of claim 6, wherein said photosensitive emulsion layer is coated on the support in an amount of not more than 3 gm$^2$ as calculated in terms of silver.

9. The recording system of claim 6, wherein said latent image forming means comprises a light irradiating means having incoherent light emitting sources arranged in a main scanning direction.

10. The recording system of claim 6, wherein said latent image forming means comprises a light source for emitting incoherent light and a light shielding means for controlling the emission of incoherent light.

* * * * *